Dec. 1, 1925.
T. A. O'SHAUGHNESSY
1,563,584
REFRACTORY GLASS PLATE OR ARTICLES AND METHOD OF PRODUCING THE SAME

Original Filed April 27, 1921

Inventor:
Thomas A. O'Shaughnessy.
Emery, Booth, Janney & Varney.
Attys.

Patented Dec. 1, 1925.

1,563,584

UNITED STATES PATENT OFFICE.

THOMAS A. O'SHAUGHNESSY, OF CHICAGO, ILLINOIS.

REFRACTORY GLASS PLATE OR ARTICLES AND METHOD OF PRODUCING THE SAME.

Application filed April 27, 1921, Serial No. 465,051. Renewed October 28, 1925.

*To all whom it may concern:*

Be it known that I, THOMAS A. O'SHAUGHNESSY, a citizen of the United States, and a resident of Chicago, Illinois, have invented an Improvement in Refractory Glass Plate or Articles and Methods of Producing the Same, of which the following is a specification.

The object of the present invention is to provide improved refractory glass or glass articles.

The character of the invention will be best understood by reference to a method and product embodying the features of the invention, which method and product are shown for illustration in the annexed drawings.

In said drawings.

Figure 2:
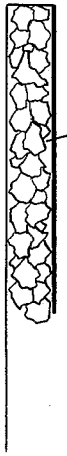
Fig. 2 is a section of glass plate embodying the invention.

The plate shown in Fig. 2, typifying any plate, sheet or article of glass, embodying the invention, is characterized by plain or substantially smooth opposite surfaces and an intervening medium or means to produce a refractory surface effect. Such intervening means may for example consist of glass of different density from that of the opposite surfaces of the plate and formed or disposed to produce a refractory surface effect such for example as would ordinarily be obtained from a plate of transparent glass having a side formed with distributed projections or indentations to present light refracting angularities. For instance the plate may be formed by integrally uniting originally separate sheets or layers of glass and incorporating glass pieces between them, these pieces being of appropriate quality and form to produce the desired effect. In the form illustrated, the plate is made by supplying fragments of glass between two layers and incorporating the same into a solid sheet or plate while the layers are at fusing heat.

Figure 1:
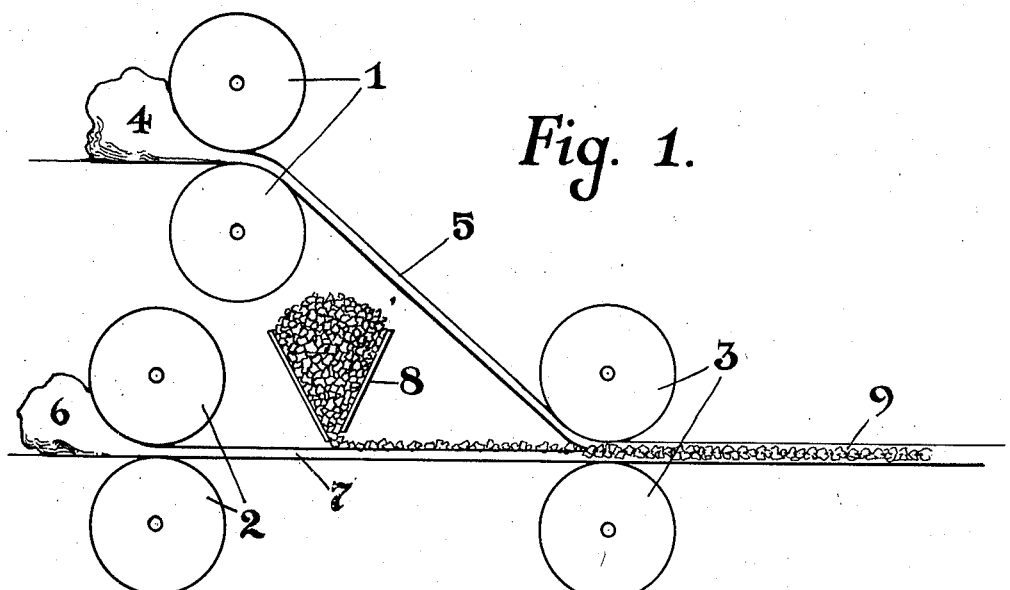
Fig. 1 is a diagrammatic view of apparatus which may be used for practicing a method embodying the present invention, also representing the practice of the illustrative method.

In Fig. 1, three sets of rollers are indicated at 1, 2, and 3, respectively. Molten glass 4 is fed through rollers 1 into the form of a sheet 5. Likewise molten glass 6 is fed through rollers 2 into the form of a sheet 7. The two layers or sheets 5 and 7 are then brought through the third set of rollers 3. At 8 is a hopper which feeds crushed, broken or granular glass, or other refractory glass, forms and distributes the same along the surface of the layer 7, thus supplying said layer with an uneven light refractory side. This broken glass is desirably of different density from the glass composing the layers. As the two layers pass through the third set of rolls 3, the fragments are incorporated in the finished plate 9 emerging from said rollers.

It is thus possible to produce, if desired, a solid thickness of transparent glass having smooth opposite surfaces and yet possessing the capacity of refraction. Such glass may be kept in clean clear condition, and is superior in strength to ordinary refractory glass.

It will be understood that plate and articles embodying the present invention may be made in forms other than flat, for instance in curved, bowl-shaped and lens forms.

Obviously the present invention is not limited to any precise form of construction nor to any particular practice of methods embodying the invention. Moreover, it is not indispensable that all of the features of the invention be used conjointly as they may be used to advantage in various different combinations and sub-combinations.

I claim:

1. Substantially smooth-surfaced refractory glass comprising a rolled sheet composed of originally separate layers of glass and interposed granular glass.

2. The method of producing smooth-surfaced refractory glass characterized by rolling molten sheets of glass with interposed granular glass into an integral sheet.

3. Substantially smooth-surfaced refractory glass composed of originally separate layers and interposed granular glass of different density than said layer.

4. The method of producing smooth-surfaced refractory glass characterized by rolling molten sheets of glass with interposed granular glass into an integral sheet, said granular glass being of different density than said layers.

In testimony whereof, I have signed my name to this specification.

THOMAS A. O'SHAUGHNESSY.